US010367900B2

(12) United States Patent
Lund (10) Patent No.: US 10,367,900 B2
(45) Date of Patent: Jul. 30, 2019

(54) PRESENCE NOTIFICATIONS (71) Applicant: METASWITCH NETWORKS LTD., Enfield (GB)

(72) Inventor: Christian Lund, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 204 days.

(21) Appl. No.: 15/377,809

(22) Filed: Dec. 13, 2016

(65) Prior Publication Data
US 2017/0171328 A1    Jun. 15, 2017

(30) Foreign Application Priority Data

Dec. 14, 2015   (GB) .................................. 1521978.5

(51) Int. Cl.
  *G06F 15/173* (2006.01)
  *H04L 29/08* (2006.01)
  *H04L 29/06* (2006.01)

(52) U.S. Cl.
  CPC .............. *H04L 67/24* (2013.01); *H04L 67/18* (2013.01); *H04L 67/26* (2013.01); *H04L 67/02* (2013.01); *H04L 67/42* (2013.01)

(58) Field of Classification Search
  CPC ......... H04L 67/24; H04L 67/26; H04L 67/18; H04L 67/42; H04L 67/02
  See application file for complete search history.

(56) References Cited

U.S. PATENT DOCUMENTS

| | | | | |
|---|---|---|---|---|
| 6,560,217 B1 * | 5/2003 | Peirce, Jr. | ............... | H04L 45/58 370/351 |
| 6,975,655 B2 * | 12/2005 | Fischer | ................. | H04L 1/0003 370/395.62 |
| 6,999,433 B2 * | 2/2006 | Baum | ................. | H04L 12/6418 370/328 |
| 7,227,872 B1 * | 6/2007 | Biswas | ............. | H04L 29/12367 370/465 |
| 8,060,121 B1 * | 11/2011 | Sun | ......................... | H04W 4/00 370/310.2 |
| 9,014,675 B1 * | 4/2015 | Sun | ........................ | H04W 64/00 340/506 |
| 2001/0053214 A1 | 12/2001 | Kleinoder et al. | | |
| 2002/0069276 A1 * | 6/2002 | Hino | .................... | H04L 12/2803 709/223 |
| 2003/0018753 A1 * | 1/2003 | Seki | ..................... | H04L 12/2803 709/219 |
| 2003/0215080 A1 | 11/2003 | Wengrovitz | | |
| 2006/0155802 A1 * | 7/2006 | He | .......................... | H04L 29/06 709/203 |

(Continued)

Primary Examiner — Richard G Keehn
(74) Attorney, Agent, or Firm — EIP US LLP (57) ABSTRACT

Measures, including methods, systems and non-transitory computer-readable storage mediums, for use in providing presence notifications on behalf of an endpoint that does not participate in presence notification are disclosed. In embodiments, the presence server receives notifications from a switch providing services to the non-participating endpoint relating to that endpoint's status from which presence can be determined. This information is processed using a dummy roster in order to send out notifications. The dummy roster may be created responsive to receiving a subscription to presence notifications for the non-participating endpoint.

13 Claims, 4 Drawing Sheets (56) References Cited

U.S. PATENT DOCUMENTS

| | | | |
|---|---|---|---|
| 2008/0209034 A1* | 8/2008 | Shin | H04L 12/2825 709/224 |
| 2009/0060028 A1* | 3/2009 | Liu | H04N 21/43615 375/240.01 |
| 2009/0077239 A1* | 3/2009 | Kaneko | H04L 41/06 709/227 |
| 2009/0098875 A1* | 4/2009 | De Beer | H04W 88/184 455/445 |
| 2010/0008306 A1* | 1/2010 | Pan | H04W 76/10 370/329 |
| 2010/0135278 A1* | 6/2010 | Dingler | H04L 12/14 370/352 |
| 2010/0180037 A1* | 7/2010 | Dessart | H04L 63/0272 709/227 |
| 2010/0217837 A1* | 8/2010 | Ansari | G06Q 30/04 709/218 |
| 2011/0035443 A1* | 2/2011 | Jensen | H04W 4/20 709/204 |
| 2011/0106279 A1* | 5/2011 | Cho | G08C 17/02 700/90 |
| 2011/0138208 A1* | 6/2011 | Lee | H04L 12/10 713/323 |
| 2011/0142209 A1* | 6/2011 | Maes | H04M 3/2218 379/88.12 |
| 2012/0176247 A1* | 7/2012 | Feldstein | H04N 21/4131 340/654 |
| 2012/0246255 A1* | 9/2012 | Walker | H04W 60/005 709/208 |
| 2013/0132501 A1* | 5/2013 | Vandwalle | H04L 67/104 709/208 |
| 2013/0185373 A1* | 7/2013 | Vandwalle | H04W 56/0015 709/208 |
| 2014/0112336 A1 | 4/2014 | Yoakum et al. | |
| 2014/0150073 A1* | 5/2014 | Bone | H04L 63/0853 726/5 |
| 2014/0280998 A1* | 9/2014 | Richards | H04L 45/306 709/230 |

* cited by examiner

PRESENCE NOTIFICATIONS

CROSS-REFERENCE TO RELATED APPLICATIONS

This application claims priority under 35 U.S.C. § 119(a) to UK Patent Application No. GB1521978.5, filed on Dec. 14, 2015, the entire content of which is hereby incorporated by reference.

BACKGROUND OF THE INVENTION

Field of the Invention

The present disclosure relates to sharing presence information in telecommunication networks. In particular, but not exclusively, the present disclosure relates to measures, including methods, systems and computer program products, for providing presence information on behalf of devices which do not provide their own presence information.

Description of the Related Technology

With the advent of intelligent telecommunication endpoints such as VoIP desk phones, smartphones and VoIP clients on computers it has become commonplace to provide presence information for contacts using such endpoints, allowing users to easily see whether one of their contacts is available for a telephone call, for example. This presence information is easy to produce and consume using existing technology, such as eXtensible Messaging and Presence Protocol (XMPP hereafter) which provides presence and messaging services for endpoints mediated by a server. Such endpoints are therefore clients of the presence server.

However, it is challenging to obtain presence information for endpoints that do not support presence protocols such as XMPP. Such endpoints are referred to in this document as "dumb". In particular, it may be desirable to obtain presence information for legacy telephone end-points, which are not able to generate their own presence information. Furthermore, it may be desirable to obtain presence information from end points configured to be unable to participate in communication with a presence server for policy or security reasons. Such end points may well be "intelligent" in principle, having the capacity to communicate via XMPP, but their disability to do so means that they can also be referred to as "dumb" for our purposes.

Figure 1:
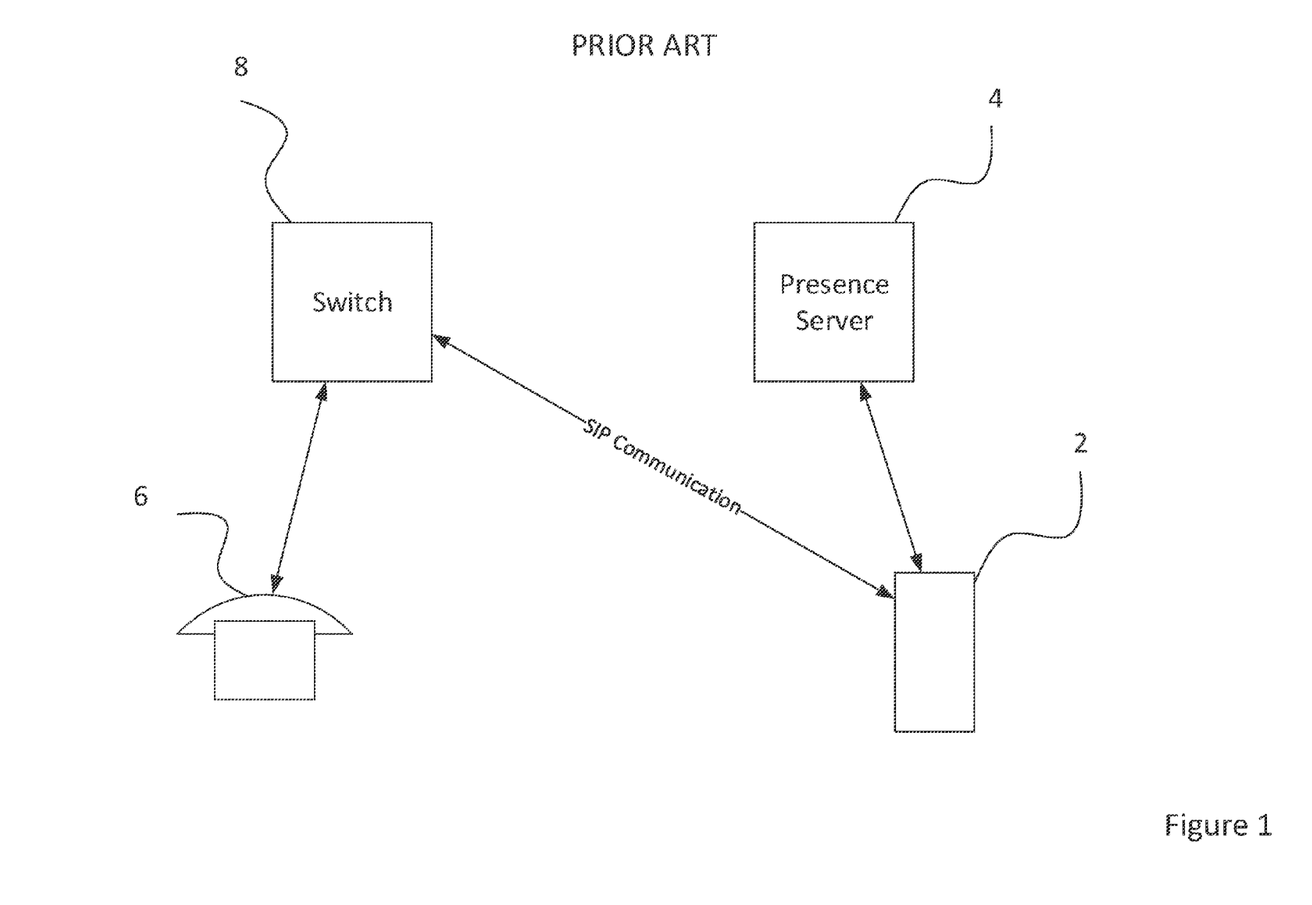
FIG. 1 shows a prior art arrangement for providing presence information for dumb endpoints.

With reference now to FIG. 1, a prior art solution to this challenge is portrayed. Endpoint 2 is in communication with presence server 4. The user of endpoint 2 desires to see presence information for dumb endpoint 6, but presence server 4 is not able to provide this information as endpoint 6 is not in communication with it. Instead, endpoint 2 sends a SIP SUBSCRIBE message to the switch 8 that provides telecommunications services to endpoint 6. By using the SIP SUBSCRIBE method, endpoint 2 receives SIP NOTIFY messages when the state of endpoint 6 changes, for example when a call is answered, providing presence functionality.

There are a number of drawbacks with prior art approaches to this challenge. For example, they require that the endpoint be able to engage in SIP communication with the switch, which may require further complexity on the part of the endpoint and access to the switch which may not be possible for policy or security reasons. Secondly, it is often desired by users to see presence information for a large number of lines. If there are multiple users each subscribing to the switch for the presence information of multiple endpoints, then the number of subscriptions on the switch will rapidly increase to unsustainable levels.

It would be desirable to provide presence information for dumb endpoints in a way that scales well and allows a simple client implementation, which is difficult with prior art approaches to this problem.

SUMMARY

According to embodiments there is a method for operating a presence service to provide presence information on behalf of a first telecommunications device, the method comprising: determining that the first telecommunications device does not take part in presence notification, the first telecommunications device being coupled to a first telecommunications server; creating a virtual presence notification roster on behalf of the first telecommunications device; receiving, by the presence service and from the first telecommunications server, a status notification comprising a status indication for the first telecommunications device; generating and storing presence data based at least in part on the status indication; receiving, by the presence service and from a second telecommunications device, a subscription to presence information for the first telecommunications device; and sending, by the presence service, a presence notification to the second telecommunications device comprising presence information for the first telecommunications device based at least in part on the status indication.

According to embodiments there is a presence server (or system), comprising: a first interface for receiving status notification messages from a telecommunications server, the telecommunications server being coupled to a first telecommunications device; a second interface for receiving presence subscriptions and sending presence notification messages; a memory for storing presence notification rosters; and a processor, wherein the processor is configured in use to: create a virtual presence notification roster in the memory on behalf of the first telecommunications device upon determining that the first telecommunications device does not take part in presence notification; send presence notification messages via the second interface based at least in part on status notification messages received via the first interface.

According to embodiments there is a non-transitory computer-readable storage medium comprising computer-executable instructions which, when executed by a processor, cause a computing device to perform a method comprising: operating a presence service to provide presence information on behalf of a first telecommunications device; the first telecommunications device being coupled to a first telecommunications server; the method comprising: determining that the first telecommunications device does not take part in presence notification; creating a virtual presence notification roster on behalf of the first telecommunications device; receiving, by the presence service and from the first telecommunications server, a status notification comprising a status indication for the first telecommunications device; storing presence data based at least in part on the status indication; receiving, by the presence service and from a second telecommunications device, a subscription to presence information for the first telecommunications device; and sending, by the presence service, a presence notification to the second telecommunications device comprising presence information for the first telecommunications device based at least in part on the status indication.

According to embodiments there is a method for operating an XMPP presence server to provide presence information on behalf of a dumb endpoint, the method comprising: receiving an AMQ message by the presence server from an aggregation server, the AMQ message comprising a status indication for the dumb endpoint, the dumb endpoint being served by a switch, the switch being coupled to the presence server via the aggregation server; storing presence data based at least in part on the status indication; receiving, by the presence server and from an XMPP client, an XMPP subscription to presence information for the dumb endpoint; creating a virtual presence notification roster on behalf of the dumb endpoint; populating the virtual presence notification roster with details of the XMPP client; and sending, by the presence server and to the XMPP client, an XMPP presence notification based at least in part on the stored presence data. In some embodiments, populating the virtual presence notification roster occurs automatically.

Further features of the present disclosure will become apparent from the following description of embodiments of the disclosure, given by way of example only, which is made with reference to the accompanying drawings.

DETAILED DESCRIPTION OF CERTAIN INVENTIVE EMBODIMENTS

The present disclosure describes a presence service which provides presence notifications to telecommunications devices that are clients of the presence service. The skilled person will realize that such a service may be implemented in a number of different ways, including running as a process on a physical computer server; running as a virtual machine or container or similar in a data center; running as a sub-process on an existing telecommunications server (such as an application server) amongst others. The term "server" is used in this disclosure to refer to any appropriate computer device, virtual or physical, capable of performing network communications and processing.

The skilled person will further realize that, in order to provide service to large numbers of clients, the service may be provided by multiple such servers working together in a cluster, with the load being distributed between the servers in an appropriate way.

Telecommunications device is used in this disclosure as an umbrella term for a large number of devices. The skilled person will realize that legacy landline telephones, mobile phones, VoIP phones and communications clients on computers or other devices will all fall under such term, and it is used inclusively to indicate devices that at least in part take part in telecommunications networks.

Figure 2:
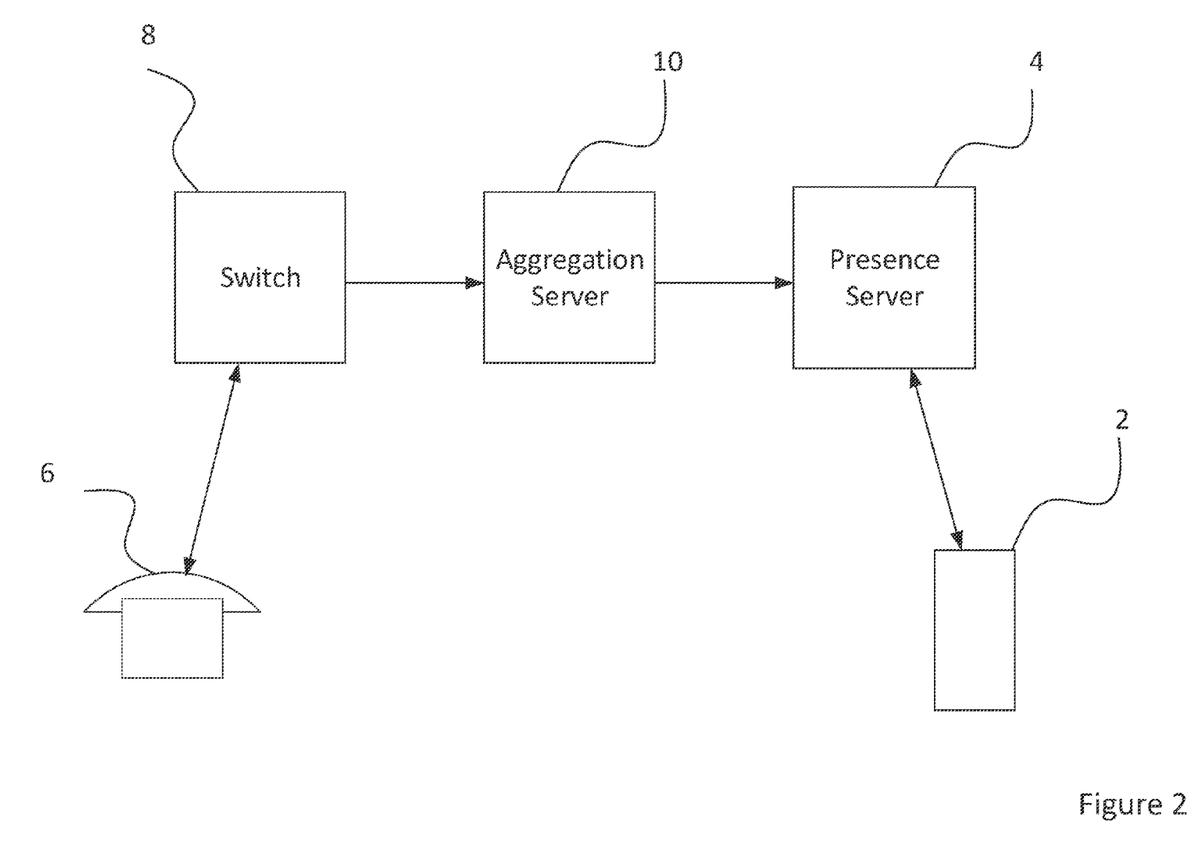
FIG. 2 is a schematic of a system implementing an embodiment of the present disclosure.

Referring now to FIG. 2, a schematic view of a system comprising a presence service according to an embodiment of the present disclosure is displayed. Like numerals are used for like components as in FIG. 1, although the Presence Server 4 has been enhanced to operate according to an embodiment. As in FIG. 1, first telecommunications device 6 is a dumb endpoint that does not communicate presence information with presence server 4. First telecommunications device 6 is in communication with switch 8, which performs usual telecommunications functions such as connecting calls in the case of a simple telephone or other communications such as forwarding text-based messages, for example, in other cases.

Second telecommunications device 2 is a client of presence server 4 and exchanges messages with it to subscribe to presence notifications for other telecommunications devices and receive presence notifications. If the user of device 2 wishes to receive presence notifications relating to device 6, unlike in FIG. 1 the device simply subscribes to presence notifications for first device 6 in the usual way via the presence protocols.

Since switch 8 is in communication with endpoint 6, it is able to derive information about the presence of the endpoint without being notified of that presence. For example, in the case of a telephone, switch 8 can determine that the presence is "busy" if the telephone is engaged in a phone call. It may also be able to track changes in the endpoint's status, such as when a communication session ends, and generate status notifications comprising status indications to inform other devices about the changing status of endpoint 6. In one embodiment, it is possible for presence server 4 to consume these status notifications directly and generate presence notifications based at least in part on them for communication to device 2.

As depicted in FIG. 2, however, in embodiments an intermediate aggregation server 10 receives the status notifications from switch 8 before sending on the status indications to presence server 4. In particular, this may be desirable in order to provide a degree of separation between the presence server and the switch(es) of the core telecommunication network; or alternatively to act as a single point of contact for presence server 4, aggregating status notifications from multiple switches 8. It may also be desirable for aggregation server 10 to reduce the load on the network by reducing the size of the status notifications before sending them on to Presence server 4. In particular, a straightforward way of receiving status notifications from switch 8 is to send a SIP SUBSCRIBE message to it, either for individual lines (endpoints) or if supported a wildcarded subscription to all lines matching a particular set of criteria. However, the generated SIP NOTIFY messages are quite large, and contain much information that is extraneous to presence notification. Accordingly, in one embodiment, aggregation server 10 communicates status notifications to presence server 4 using a more efficient communication mechanism, such as Advanced Message Queue (AMQ hereafter) technology, these notifications comprising a subset of the information communicated on the original SIP NOTIFY. The skilled person will readily realize that other appropriate communications protocols may be used between switch 8, aggregation server 10 and presence server 4.

Upon receipt by presence server 4 of status notifications directly or indirectly from switch 8, presence server 4 can generate presence notifications based at least in part on the status indication contained in the status notification and communicate them to endpoint 2. Presence server 4 may also store presence data indicating the status of endpoint 6, so that it is capable of answering future probes about the status of endpoint 6 for example in the case that endpoint 2 restarts.

In order to explain more fully how presence server 4 tracks subscriptions for presence notifications and handles other matters, it is helpful to introduce the concept of a roster. Rosters are used by the presence server in order to track for each client which other endpoints it wants to receive presence notifications for. A roster might be stored in any appropriate data structure, such as a database, tree, flat list, hash table or many other alternatives.

With reference by example to the open source software project Ejabberd™, each endpoint has, on the presence server, a roster that tracks interested parties (which clients receive presence for this endpoint) and interesting parties (which clients the endpoint wants to receive presence for). That is, for each user X, there exists a roster which may contain another user Y. If X receives notifications about Y, then Y is listed and marked as "from". If Y receives notifications about X, then Y is listed and marked as "to". If X both receives notifications about Y AND Y receives notifications about X then Y is listed as "both". If Y is unknown to X, then there is no entry for Y in the roster of X.

When X connects (for example at the start of day), then the processing is as follows: X sends its current status—e.g. "connected" to the presence server, which is then sent out to all of the entries in the roster that are marked with "both" or "to" so they know what X's status is. X sends a probe to the presence server for entries marked with "both" or "from" to determine their status, and if connected the server responds with their current presence status. When X's status changes, either explicitly or because a connection is dropped, then this update is broadcast to all the elements in the roster marked "to" or "both".

Population of the rosters is based on a subscription and approval mechanism. Normally, a client discovers the identity of another client through other means (such as a directory lookup), and "adds" the user to their roster manually. As part of this, they desire to receive presence notifications from this person. X adds Y, and desires to receive status from them; Y is added to X's roster marked "from pending". A request is sent to Y for Y to approve; should Y approve it, then a confirmation is returned to X, and Y's entry in X's roster is updated to say "from" (the request is no longer pending). The mirror roster—Y's roster—has X in it, marked "to". Clearly, Y could add X in normal operation and so the "from"/"to" would become "both" via "to, from pending" etc. in due course.

Other presence technologies and servers may in practice work slightly differently, but all will have some manner of roster system for tracking which endpoints are interesting to other endpoints to enable presence notifications to be sent.

A challenge is providing presence notifications for devices like endpoint 6 that do not participate in presence notifications and do not have a roster. Furthermore, there is no way for endpoint 6 to approve the subscription for presence notifications (since it does not communicate with presence server 4), so even if a roster is created for endpoint 6, endpoint 2's roster will never progress beyond "from pending" and presence notifications will not be sent. Accordingly, a dummy or virtual presence notification roster is created that can be used for the dumb endpoint, as opposed to a "normal" roster as would be used for a client of the server. The server is able to determine which rosters are dummy rosters and which are normal by an appropriate mechanism such as a flag on the roster itself or a lookup in another data structure based at least in part on an identifier or characteristic.

Figure 3:
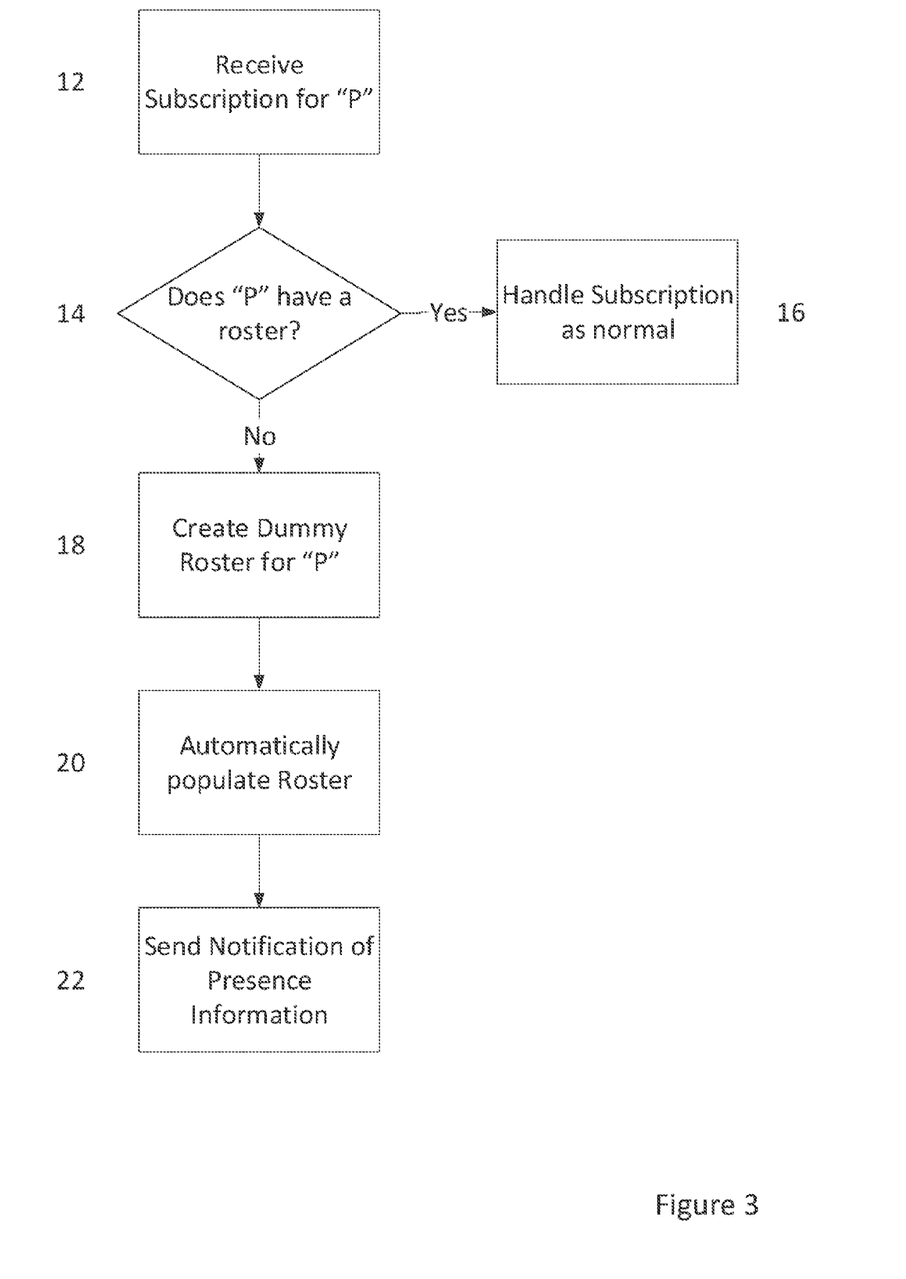
FIG. 3 is a flow chart detailing actions taken by a presence server in response to the receipt of a subscription to presence information according to an embodiment of the present disclosure.

With reference now to FIG. 3, the process for handling subscription requests for dumb endpoints is described according to an embodiment in more detail. When presence server 4 receives a subscription for any endpoint, it is normally identified using an identifier such as a telephone number assigned to an endpoint or a SIP URI. At step 12, the server receives a subscription with identifier "P" for the first time. At step 14, a check is made to determine whether a normal roster exists for identifier "P". If it does, then "P" is already in communication with presence server and the subscription can be handled as normal at step 16 with approval being given (or withheld) by the user of the endpoint(s) associated with P as appropriate.

If a normal roster does not exist for "P" (or if a dummy roster already exists for it) then it is an identifier associated with a dumb endpoint. At step 18, a dummy roster is created on behalf of the dumb endpoint and associated with the identifier "P" (if not already created). At this point, the roster for the subscribing endpoint is populated as usual with "from pending" associated with "P". At step 20, based at least in part on the fact that the roster is a dummy roster, the request is automatically accepted and the dummy roster for "P" as well as the normal roster are populated with "to" and "from" as appropriate. For example, the method may comprise automatically populating the virtual presence notification roster with an identifier for the second telecommunications device.

In other embodiments, the acceptance step may not be employed if approval of the endpoint is not required, even skipping the "from pending" step and going directly to "from". Finally, at step 22, the subscription processing is completed by sending a presence notification comprising presence information for the dumb endpoint with identifier "P". Alternatively, the notification might be sent out responsive to further communication from the subscribing endpoint e.g. a probe.

Future subscriptions with identifier "P" can be added to the dummy roster and automatically accepted as above.

Figure 4:
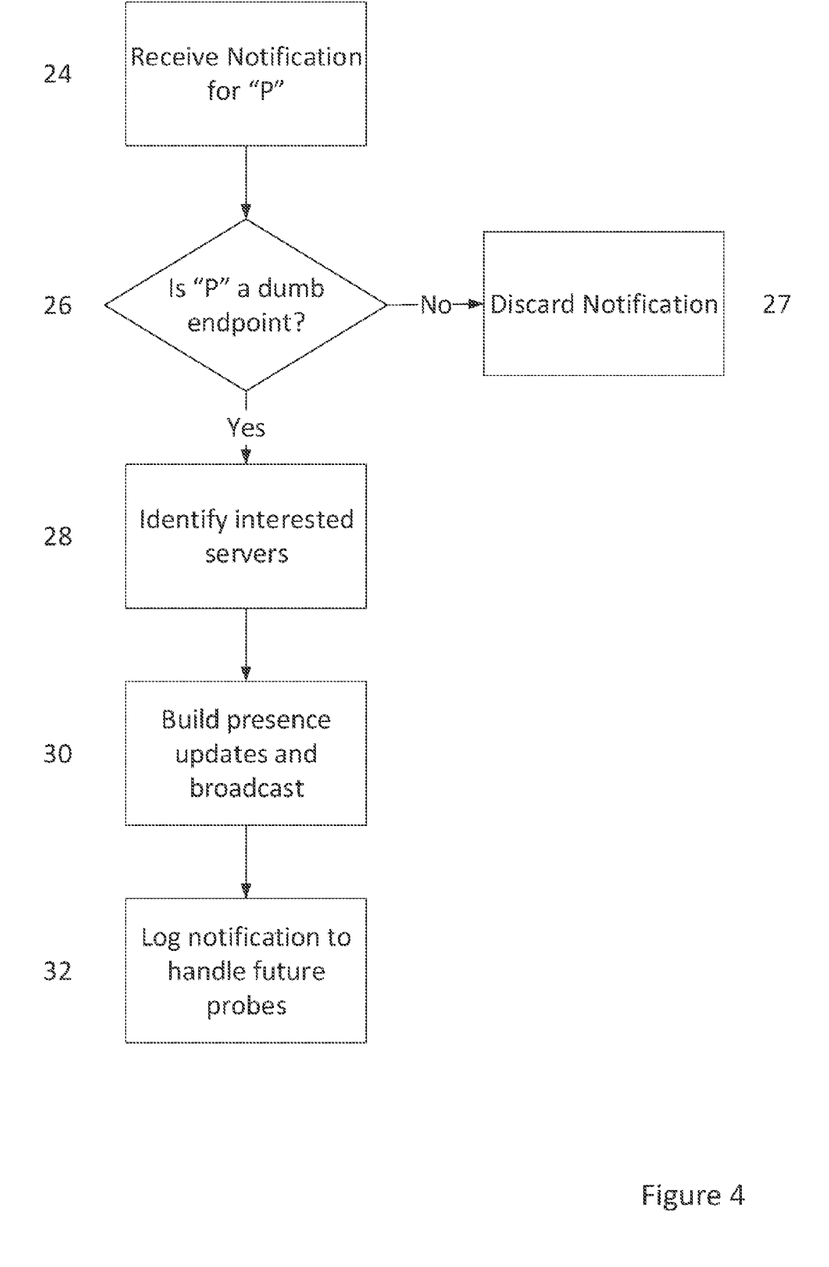
FIG. 4 is a flow chart detailing actions taken by a presence server in response to the receipt of a notification of presence status change according to an embodiment of the present disclosure.

With reference now to FIG. 4, the process for handling status notifications from (directly or indirectly) the switch (or other telecommunications server) is described according to an embodiment. At step 24, the presence server receives a status notification for endpoint with identifier "P". In one embodiment, this may be because the presence server has indicated (e.g. via a SIP SUBSCRIBE or other appropriate method) to the switch or aggregation server that it wishes to receive such notifications. In other embodiments, the switch may be configured to send status notifications for all endpoints registered to the same business or similar such that presence may be determined for them. Further alternatively, the switch may be polled as required by the presence server or aggregation server. Still further alternatively, the subscription or otherwise to notifications may be handled by the aggregation server, with the presence server remaining unaware of the process and simply consuming the forwarded notifications. In such an embodiment, configuration on the aggregation server may indicate which subscriptions it is to make.

At step 26, the server checks to see if "P" is a dumb endpoint. This might be done in a similar manner to step 14 of FIG. 3, checking to see if a roster exists, and perhaps additionally checking to see if the roster is a dummy roster or a normal one. If "P" is not a dumb endpoint, that is to say that it does participate in presence notification, then the status notification from the switch need not be kept and can be discarded in step 27 (since "P" already notifies the presence server of changes to its status). If "P" is a dumb endpoint, then at step 28 it is determined which servers are interested in notifications about "P". As previously mentioned, in the case that there are multiple servers acting together to provide a presence service, not all servers need act on each status notification. This step acts to identify which servers do need to act upon the particular status notification, so that the notification (or aspects extracted from it, or data generated from it) can be sent to those servers. In one embodiment, the cluster is a "flat" cluster where any server might be selected for first receipt of the message, and then look up which servers (possibly including itself) need act (or at least be informed) on the notification. This might be a one-step lookup, identifying every other server, or simply looking up the "next" server and so daisy-chaining the notification through the cluster. In other embodiments, the presence service may comprise a load balancing node or similar to farm out the status notifications to the appropriate presence servers whilst not actually being a presence server itself. Of course, if the presence service is provided by a single presence server, this step is superfluous.

At step 30, the presence server(s) build presence notifications based at least in part on the received status notification (or aspects or generated data). These are then sent out to all of the clients whose rosters indicate that they are interested in "P". At step 32, the presence data for handling future probes is logged. The logging may be against the dummy roster for "P", the rosters of clients interested in "P" or in a separate log of received status indications. This allows future requests for "P" to be answered, even in the case that no servers yet have an interest in "P". The skilled person will realize that steps 30 and 32 (and, to some extent, 28) may be carried out in various orders, or substantially simultaneously.

Referring again to step 26, in other embodiments status notifications for endpoints that are clients of the presence service might not be discarded, but used to support, enhance or even replace the usual presence notification techniques. In particular, given the highly scalable nature of presence notification in accordance with above embodiments, the presence server might treat all endpoints as "dumb" and automatically accept subscriptions, automatically populating the roster and sending notifications based at least in part on status notifications from the switch rather than presence notifications from the endpoints.

In embodiments, switch 8 may be replaced by another telecommunications server, such as a gateway, application server, Session Border Controller or other telecommunications server capable of tracking the status of endpoint 6.

In embodiments as described above, the switch 8 may send status notifications pre-emptively for endpoints which presence server 4 has not yet received any subscriptions for. Upon receipt of these notifications, presence server 4 may simply log the received status indication (or generated presence data) for use in handling future subscription requests or polls. Alternatively, in a manner analogous to FIG. 3, the receipt of such status notifications may be used to identify dumb devices and pre-emptively create dummy rosters for them. In a further embodiment, dummy rosters for dumb endpoints might be created based at least in part on configuration rather than responsive to received messages. This might be particularly desirable where it is desired for all users to be able to see presence for all other users in a similar group, avoiding the subscription model completely. Of course, in such an embodiment dummy rosters could still be created responsive to incoming status notifications to handle endpoints being added that are not pre-configured.

In embodiments, it may be desirable to be able to replace a dummy roster for a dumb endpoint with a normal roster. This may happen, for example, in the case of a device which was incapable of presence communication being replaced by a new device that can; or by the relaxing of policies which prevented its communication with the presence server. Upon receipt of a request to create a roster for an identifier already associated with a dummy roster, the presence server may replace the existing dummy roster or otherwise modify it to become a normal roster. This roster may retain the entries that were previously added, or instead the replacement or conversion could trigger a purge of the existing entries.

In embodiments, multiple devices together may share an identifier, for example, a dumb device and an endpoint capable of presence communication. In such embodiments, access to status information for the dumb device may be used to enhance the presence notification for the more capable endpoint, such as providing a "busy" presence indication when the dumb device is busy but the capable device is not.

Embodiments may comprise populating the virtual presence notification roster with an identifier for the second telecommunications device. In some embodiments, the populating occurs automatically.

Embodiments may comprise receiving a probe at the presence service from the second telecommunications device, the probe being a request for presence information of the first telecommunications device; retrieving the stored presence data of the first telecommunications device; and sending, by the presence service, a presence notification to the second telecommunications device comprising presence information for the first telecommunications device based at least in part on the stored presence data.

Embodiments may comprise sending, by the presence service and to the first telecommunications server, a request for a status indication for the first telecommunication device.

In embodiments, the presence service comprises a plurality of presence servers; the method further comprising: upon receipt of a status notification for the first telecommunications device, sending said status notification to the presence servers which have received subscriptions to presence information for the first telecommunications device.

Embodiments may comprise maintaining a list of presence servers which have received subscriptions to presence information for the first telecommunications device.

In embodiments, the first telecommunications server comprises a switch for providing telecommunications services to the first telecommunications device.

In embodiments, the first telecommunications server comprises an aggregation server coupled to a second telecommunications server, the second telecommunications server providing telecommunications services to the first telecommunications device.

Embodiments comprise determining that the first telecommunications device does not take part in presence notification is based at least in part on receiving a subscription to presence information for the first telecommunications device and determining that a presence notification roster does not exist for the first telecommunications device.

Embodiments comprise determining that the first telecommunications device does not take part in presence notification is based at least in part on receiving a status notification comprising a status indication for the first telecommunications device and determining that a presence notification roster does not exist for the first telecommunications device.

Embodiments comprise determining that the first telecommunications device does not take part in presence notification is based at least in part on predetermined configuration data.

Embodiments may comprise receiving by the presence service a message from the first telecommunications device for beginning participation in presence notification; and replacing the virtual presence notification roster created on behalf of the first telecommunications device with a normal presence notification roster for the first telecommunications device.

In this document, reference is made to status notifications comprising status indications, presence data that is stored by the presence server (in memory or local or remote storage) and presence notifications comprising presence information. The skilled person will realize that the status indications, presence data and presence information may be substantially (or even completely) identical, or may be subject to processing and modification at one or more steps. Provided that the presence information received by the endpoint is understandable, it does not matter at what point the processing to make it understandable takes place. Indeed, in some embodiments, the switch or other server may send its status notifications already comprising appropriate presence information that need not be manipulated.

The above embodiments are to be understood as illustrative examples of embodiments. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method for operating a presence service to provide presence information on behalf of a first telecommunications device, the method comprising:
   creating a virtual presence notification roster on behalf of the first telecommunications device upon determining that the first telecommunications device does not take part in presence notification, the first telecommunications device being coupled to a first telecommunications server;
   receiving, by the presence service and from the first telecommunications server, a status notification comprising a status indication for the first telecommunications device;
   generating and storing presence data based at least in part on the status indication;
   receiving, by the presence service and from a second telecommunications device, a subscription to presence information for the first telecommunications device;
   sending, by the presence service, a presence notification to the second telecommunications device comprising presence information for the first telecommunications device based at least in part on the status indication;
   receiving, by the presence service, a message from the first telecommunications device for participating in presence notification; and
   replacing the virtual presence notification roster created on behalf of the first telecommunications device with a normal presence notification roster for the first telecommunications device.

2. The method of claim 1, comprising populating the virtual presence notification roster with an identifier for the second telecommunications device.

3. The method of claim 1, comprising:
   receiving a probe at the presence service from the second telecommunications device, the probe being a request for presence information of the first telecommunications device;
   retrieving the stored presence data of the first telecommunications device; and
   sending, by the presence service, a presence notification to the second telecommunications device comprising presence information for the first telecommunications device based at least in part on the stored presence data.

4. The method of claim 1, comprising sending, by the presence service and to the first telecommunications server, a request for a status indication for the first telecommunication device.

5. The method of claim 1, wherein the presence service comprises a plurality of presence servers, the method comprising:
   upon receipt of a status notification for the first telecommunications device, sending the status notification to one or more presence servers in the plurality of presence servers which have received subscriptions to presence information for the first telecommunications device.

6. The method of claim 5, comprising maintaining a list of presence servers which have received subscriptions to presence information for the first telecommunications device.

7. The method of claim 1, wherein the first telecommunications server comprises a switch for providing telecommunications services to the first telecommunications device.

8. The method of claim 1, wherein the first telecommunications server comprises an aggregation server coupled to a second telecommunications server, the second telecommunications server providing telecommunications services to the first telecommunications device.

9. The method of claim 1, wherein determining that the first telecommunications device does not take part in presence notification is based at least in part on receiving a subscription to presence information for the first telecommunications device and determining that a presence notification roster does not exist for the first telecommunications device.

10. The method of claim 1, wherein determining that the first telecommunications device does not take part in presence notification is based at least in part on receiving the status notification comprising the status indication for the first telecommunications device and determining that a presence notification roster does not exist for the first telecommunications device.

11. The method of claim 1, wherein determining that the first telecommunications device does not take part in presence notification is based at least in part on predetermined configuration data.

12. A presence server, comprising:
   a first interface for receiving status notification messages from a telecommunications server, the telecommunications server being coupled to a first telecommunications device;
   a second interface for receiving presence subscriptions and sending presence notification messages;
   a memory for storing presence notification rosters; and
   a processor, wherein the processor is configured in use to:
   create a virtual presence notification roster in the memory on behalf of the first telecommunications device upon determining that the first telecommunications device does not take part in presence notification;
   send presence notification messages via the second interface based at least in part on status notification messages received via the first interface; and
   in response to a message being received from the first telecommunications device for participating in presence notification, replace the virtual presence notification roster created on behalf of the first telecommunications device with a normal presence notification roster for the first telecommunications device.

13. A method for operating an eXtensible Messaging and Presence Protocol (XMPP) presence server to provide presence information on behalf of a dumb endpoint, the method comprising:

receiving an Advanced Message Queue (AMQ) message by the presence server from an aggregation server, the AMQ message comprising a status indication for the dumb endpoint, the dumb endpoint being served by a switch, the switch being coupled to the presence server via the aggregation server;

storing presence data based at least in part on the status indication;

receiving, by the presence server and from an XMPP client, an XMPP subscription to presence information for the dumb endpoint;

creating a virtual presence notification roster on behalf of the dumb endpoint upon determining that the dumb endpoint does not take part in presence notification;

populating the virtual presence notification roster with details of the XMPP client; and sending, by the presence server and to the XMPP client, an XMPP presence notification based at least in part on the stored presence data.

* * * * *